May 29, 1923.

L. J. MITCHELL

TRACTOR

Filed Sept. 22, 1921

WITNESSES

L. J. Mitchell.
INVENTOR

BY

ATTORNEYS

May 29, 1923.

L. J. MITCHELL

TRACTOR

Filed Sept. 22, 1921      3 Sheets-Sheet 2

INVENTOR
L. J. Mitchell.
BY
ATTORNEYS

May 29, 1923.

L. J. MITCHELL

TRACTOR

Filed Sept. 22, 1921

WITNESSES

INVENTOR
L. J. Mitchell.
BY
ATTORNEYS

Patented May 29, 1923.

1,456,905

UNITED STATES PATENT OFFICE.

LEONIDAS JAMES MITCHELL, OF HUNTINGTON, WEST VIRGINIA.

TRACTOR.

Application filed September 22, 1921. Serial No. 502,378.

*To all whom it may concern:*

Be it known that I, LEONIDAS J. MITCHELL, a citizen of the United States, and a resident of Huntington, in the county of Cabell and State of West Virginia, have invented certain new and useful Improvements in Tractors, of which the following is a specification.

This invention relates to a tractor and more particularly to a tractor of the line control type.

The object of the invention is to provide a tractor of the above character which is easy to manipulate and flexible in its operative movements.

It is also an object of the invention that the tractor be exceedingly simple in construction and capable of drawing a relatively large load.

A further object of the invention is that the tractor be capable of turning around in a comparatively small space.

A still further object of the invention is that the engine associated with the tractor may be utilized for belt work if so desired.

It is also a further object of the invention that the tractor be adapted for being connected or coupled with another tractor or a number of similar tractors to operate as a unit if so desired.

Other objects and objects relating to details of construction, combination and arrangement of parts will hereinafter appear in the detailed description to follow.

The invention is illustrative by way of example in the accompanying drawings, in which:—

Figure 1 is a vertical central sectional view of a tractor constructed in accordance with the present invention.

Figure 2:
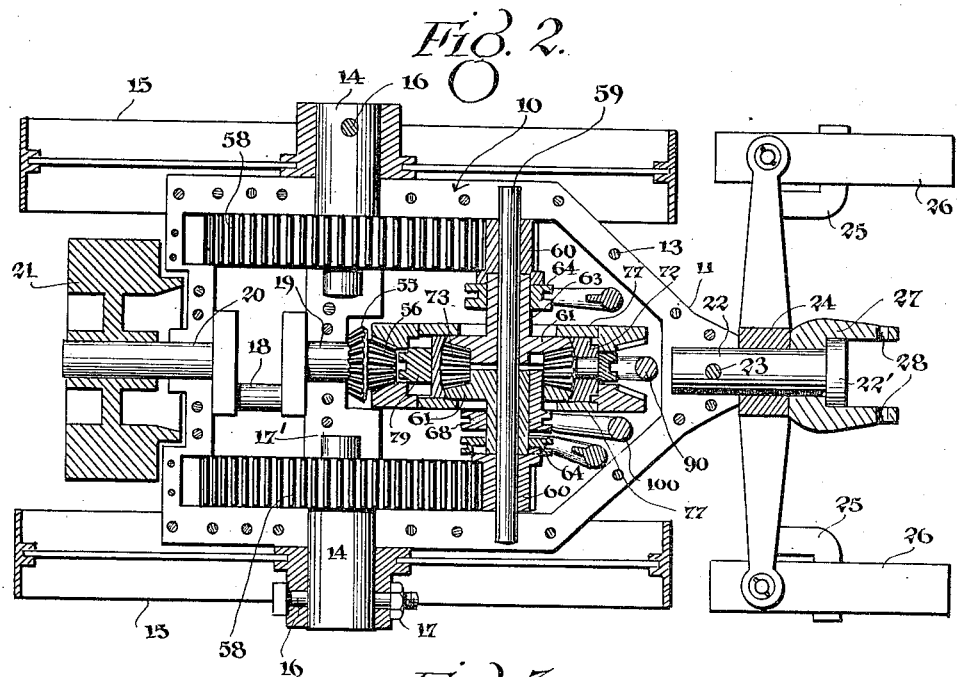
Figure 2 is a central horizontal sectional view of the same.

Referring to the drawings more particularly, 10 indicates a casting which forms the lower body portion of the tractor and which tapers at its rear end as at 11. Upon the casting 10 there is fitted a second casting generally indicated by the reference numeral 12, and the two castings are bolted together by means of flange bolts indicated at 13, Figure 2. The side walls of the two castings are suitably formed for journaling the stub axles 14, each axle having fitted thereon a bull wheel 15, and each bull wheel being held against turning movement with respect to its axle by the means of a bolt 16, said bolts being each provided with a nut 17 to prevent accidental removal thereof. The lower casting 10 is formed with an intermediate transverse wall 17' which journals the inner ends of the stub axles 14 as shown, and also rotatably supports the rear end of a crank shaft 18 as at 19. The forward end of the crank shaft is rotatably supported by the forward wall of the casting 10 as at 20, and forward of this point there is secured upon the crank shaft a fly-wheel 21. The rear end of the casting 10 has extended therein a coupling pin 22 which is held against movement by a pin 23. A casting 24 is journaled upon the pin 22 and said casting has pivoted at each of its ends a downwardly extending axle 25 which rotatably supports a caster wheel 26. Interposed between the axle 24 and the head 22' of the pin 22 is a clevis 27 having suitable openings 28 in its terminal ends adapted for connecting with the load to be drawn.

With the casting 12 is formed a cylinder 29 within which there is positioned a piston 30 which is connected with the crank shaft 20 through the connecting rod 31. The cylinder 29 is provided with a head 32 and also with a water jacket 33 which communicates with a radiator 34 through the pipes 35 and 36. As is seen the radiator may be disconnected from the water jacket by the removal of the sleeve 37. Upon the forward side of the water jacket 33 there is secured a bracket 38 which supports a stub shaft 39 at its upper end, and said stub shaft in turn having secured at its outer end a fan 40 and upon its inner end a pulley 41. The fan 40 when in operation is adapted to draw air through the radiator 34 for cooling the same, or upon rotating the fan in the proper direction the heated air about the cylinder 29 may be driven through the radiator 34 for heating the cooling liquid therein. The pulley 41 has extended thereabout a belt 42 which is also extended about an offset portion 43 of the fly-wheel 20, whereby the fan 40 may be rotated from the fly-wheel.

The upper part of the cylinder 29 communicates through a suitable port with a chamber 44, said chamber having its bottom 45 provided with a pair of openings adapted for seating a pair of tappet valves 46. The lower end of each tappet valve has secured thereto a cup-shaped member 47, and said cup shaped members being each seated upon an extended hub 48 of a beveled gear 49. The beveled gear is rotatably supported by a shaft 50 and the extended hub portion 48 is provided with a pair of raised surfaces as at 51 upon its periphery adapted to raise the valves 46 at the proper intervals when the beveled gear 49 is operated at the proper speed. The shaft 50 is supported by a suitable frame work formed in the casting 12 as shown. The beveled gear 49 is in constant mesh with a bevel pinion 52, said bevel pinion 52 being secured to the upper end of a shaft 53 which is rotatably supported by the casting 12 in the manner shown and carrying at its lower end a second bevel pinion 54 which is in constant mesh with a drive pinion 55 carried or secured upon the rear end of the crank shaft 20. The drive gear 55 has an extended hub portion which is formed into a cone-shaped gear 56, the purpose of which will later appear.

Figure 3:
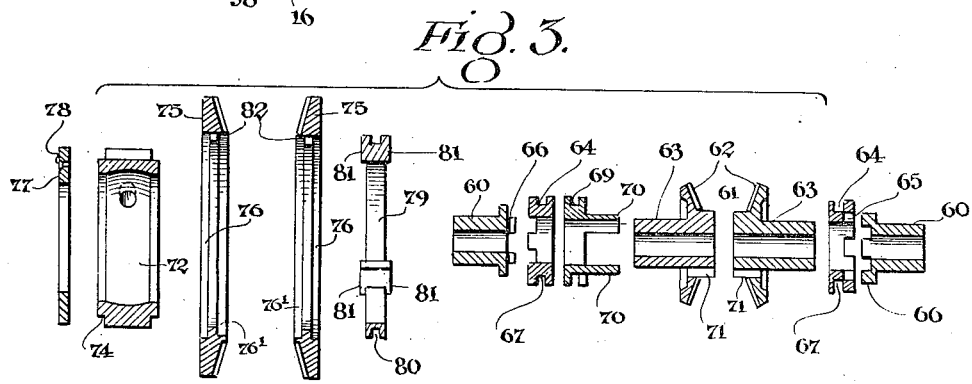
Figure 3 is a collective view showing in vertical cross section the different elements which comprise the differential unit of the tractor.
Figure 5:
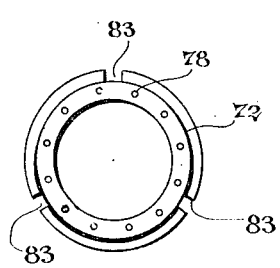
Figure 5 is a side elevation of the ring supporting the differential pinion.
Figure 4:
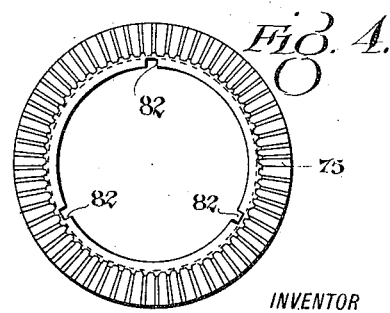
Figure 4 is an inside elevation of one of the driving gears associated with the differential unit.
Figure 6:
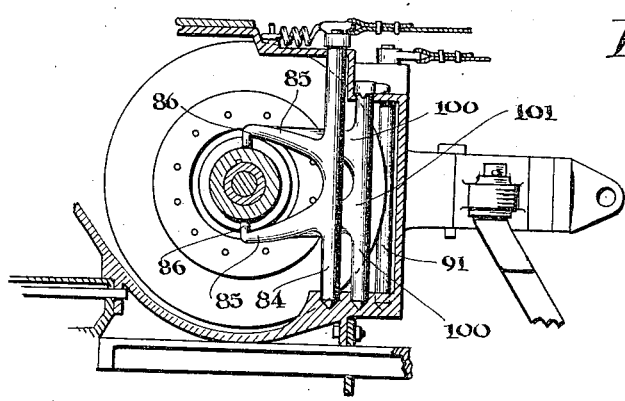
Figure 6 is a vertical sectional view taken at one side of the differential gear units and illustrating the control means therefor.
Figure 9:
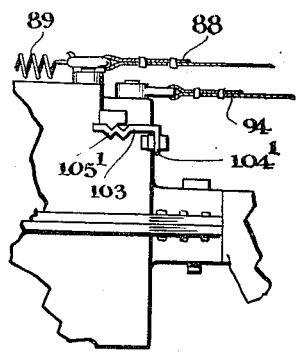
Figure 9 is a side elevation of the same.
Figure 8:
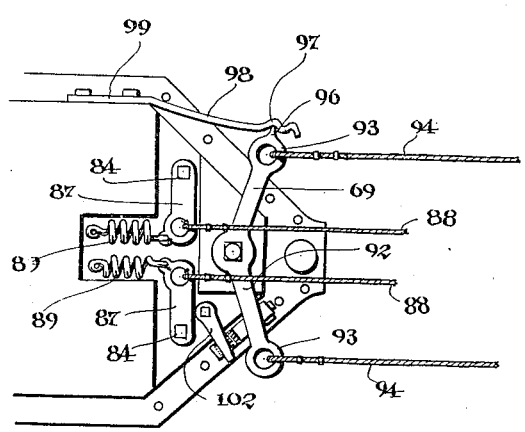
Figure 8 is a top plan view of a portion of the rear end of the tractor and illustrating the line controlling mechanism.

Upon the inner end of each stub axle 14 there is secured a large cog wheel 58 and rearward of these cog wheels there is positioned transversely of the casting 10 a shaft 59. Adjacent each end of the shaft 59 there is loosely fitted a pinion 60 and each pinion being adapted to mesh with the associated cog wheel 58. Between the pinions 60 there is also loosely fitted upon the shaft 59 a pair of different ring gears 61, each having its gear teeth beveled and said teeth opposing each other as shown at 62, Figure 3. Each ring gear 61 has an extended hub portion 63 upon which there is splined a shifter ring 64. Each shifter ring is provided with a plurality of recesses 65 in its outer end, and said recesses being adapted to receive the teeth 66 formed upon the adjacent end of each of the pinions 60. Also each of the shifter rings 64 is provided with a suitable annular groove 67 in which a shifter yoke may be disposed for moving the same. One of the extended hub portions 63 of the beveled ring gear 61 has slidable thereon a shifter ring 68 which is provided with a suitable annular groove 69 for receiving a shifter yoke for moving the same and also provided with a plurality of fingers 70 which are adapted to extend through suitable recesses 71 formed in the beveled ring gears 62 and lock said gears against movement with respect to each other if such is desired About the beveled ring gears 62 there is positioned a ring generally indicated by the reference numeral 72, said ring rotatably supporting a plurality of differential pinions 73 in a manner well understood and shown. The pinions are adapted to continuously mesh with the bevel ring gears 62. The ring 72 has formed upon its periphery adjacent each outer edge thereof an offset 74, and upon the ring 74 there is fitted a second pair of bevel ring gears 75, the offsets 74 of the ring 72 co-operating with the similar offsets 76' in the interior periphery of the bevel ring gears 75 for holding said bevel ring gears in spaced relation with each other. An annular plate is positioned in the annular offset 76 formed in each member 72 and secured by rivets indicated at 78, (Figure 5). The annular plate members 77 hold the pair of bevel gear rings 75 against displacement from the ring 72, but permits said bevel gear rings to freely rotate with respect to the ring 72. Also the annular plate members 77 hold the interior bevel ring gears 61 against movement from each other, but also permit these level ring gears to freely revolve. Between the outer bevel ring gears 75 there is disposed a shifter ring 79 which is formed with the annular groove 80 for receiving a shifter fork and which is also formed with a plurality of projections 81 which occur in pairs, as shown in Figure 3, and adapted to be brought into register with the recesses 82 formed in the inner periphery of each of the outer bevel ring gears 75. Also the ring 72 is provided with similar and aligned recesses 83, Figure 5, which are adapted for receiving the lugs 81 upon the inner periphery of the shifter ring 79.

For controlling the shifter rings 64 there is rotatably mounted adjacent each side and rear end of the body of the tractor a vertically disposed shaft differential pinions 73 in a manner well understood and shown. The pinions are adapted to continuously mesh with the bevel ring gears 62. The ring 72 has formed upon its periphery adjacent each outer edge thereof an offset 74, and upon the ring 74 there is fitted a second pair of bevel ring gears 75, the offsets 74 of the ring 72 co-operating with the similar offsets 76 in the interior periphery of the bevel ring gears 75 for holding said bevel ring gears in spaced relation with each other. Annular plate members 77 are secured to the sides of the ring 72 by means of rivets extending through the ring member 72 and the annular plate members 77 as indicated at 78, Figure 5. The annular plate members 77 hold the pair of bevel gear rings 75 against displacement from the ring 72, but permits said bevel gear rings to freely rotate with respect to the ring 72. Also the annular plate members 77 hold the interior bevel ring gears 61 against movement from each other, but also permit these bevel ring gears to freely revolve. Between the outer bevel ring gears 75 there is disposed a fourth shifter ring 79 which is formed with the annular groove 80 for receiving a shifter fork and which is also formed with a plurality of projections 81 which occur in pairs, as shown in Figure 3, and adapted to be brought into register with the recesses 82 formed in the inner periphery of each of the outer bevel ring gears 75. Also the ring 72 is provided with similar and aligned recesses 83, Figure 5, which also are adapted for simultaneously receiving the aligned projections 81 of the shifter ring 79.

For controlling the shifter ring 64 there is rotatably mounted adjacent each side and rear end of the body of the tractor a vertically disposed shaft 84, said shaft being supported at its lower end in the casting 10 and at its upper end in the casting 12 and having formed therewith a pair of shifter arms 85, each of which is formed with an inwardly turned portion 86 at its free end and adapted to engage in the annular groove 67 of the associated shifter ring 64. The upper end of each shaft 85 has rigidly secured thereto the one end of a lever arm 87 and each lever arm having at its outer end an opening suitable for connecting thereto a drive line 88. Also the outer end of each lever arm 87 is connected with the free end of a coil spring 89, the other end of said coil springs being suitably secured to the body of the tractor and adapted to normally retain the levers 87 in position for holding the shifter rings 64 in mesh with the driving pinion 60. With the shifter ring 79 there is associated a pair of forks as at 90 which extend from a vertically disposed shaft 91 mounted in a manner similar to the shaft 85, and having secured to its upper end a bell crank lever 92. The bell crank lever has formed at each of its ends an eyelet 93 with which a drive line 94 is connected. Also one of the eyelets 93 is formed with a tooth 96 which is adapted to engage in either of the pair of notches 97 formed in the outer end of a spring member 98 having its inner end secured to the tractor body as at 99. The spring 98 is so arranged that it will urge the bell-crank lever to remain in the position shown in Figure 7 and which position places the shifter ring 79 intermediate the outer beveled ring gears 75, or in what may be termed its neutral position.

Also with the shifter ring 68 there is associated a pair of shifter forks 100 which extend from a vertical shaft 101 similar to the shafts 91 and 85 and similarly mounted. Upon the upper end of the shaft 101 there is rigidly secured a lever bar 102. The outer end of the lever bar 102 is disposed to operate over a spring finger 103 which is secured at its one end to the body of the tractor as at 104'; and its free end having a pair of notches 105' in which the free end of the lever bar 102 may be brought and yieldingly held. The rearward notch serves to yieldingly hold the lever arm 102 in position for slightly withdrawing the shifter ring 68 from the inner bevel ring gears 61, while the forward notch yieldingly holds the shifter ring 68 in its position for locking the inner bevel gears 61 together. The lever bar 102 may be operated by the use of proper lines connected thereto, or it may be permitted to remain, as shown and manually operated when so desired.

In the operation of the present device, assuming that the different parts of the transmission mechanism have positions as shown in Figure 2, then the engine of the tractor would run idle and the fly-wheel 21 could be utilized for belt power. In the figure referred to as is seen the shifter ring 79 is disposed between the outer bevelled ring gears 75 and in its neutral position.

In case it is desired to advance the tractor then the shifter ring 79 is moved by manipulating the proper line 94 to a position so that its projections 81 will engage and lock together the gear 75 on the right hand side of the differential with the ring 72. Upon this occurring the gear 75 which is so locked will turn the ring 72 and carry therewith the differential pinions 73 and thus rotating the inner bevel ring gears 61 which in turn will drive the tractor through the means previously described. It is of course obvious by this arrangement the pinions 73 permit the usual advantages of a differential unit to be had.

In case that it is desired to reverse the direction of the tractor then the shifter ring 79 is simply brought to lock together the left hand gear 76 and ring 72. As is obvious by this arrangement the wheels of the tractor will then be driven in the opposite direction. Should it be desired the tractor should turn to its right the shifter ring 64 connecting the pinion 60 on the left hand side of the tractor with its associated cog wheel 58 is shifted inwardly and thus disconnecting the pinion 60 from the associated inner beveled gear 61. The ring 67 should then be shifted to lock together the gears 61. With the rotation of the ring 79 the wheel 15 connected to the shaft 59 will be rotated and turn th tractor upon its other wheel 15 as a pivot. During this movement the caster wheels 26 will adjust themselves to follow. Should it be desired to turn in the opposite direction then the operation just described should be reversed that is with respect to the shifting of the ring 64. It is of course understood that the lines 88 will be utilized for initially causing the turning movement of the tractor in the manner heretofore set out.

When the tractor is driven forward or rearward then the shifter 68 is moved to lock the gears 61 together. This may be accomplished by the movement of the lever 102 as previously explained.

Referring to Figure 1 it will be seen that I have also provided means for coupling two or more of the tractors together. This coupling means comprises a casting generally indicated by the reference numeral 9 which consists in an elongated hollow portion 8 which is pivotally connected to the casting for lateral swinging movement by a rod 106. The portion 8 is also formed with a pair of extensions 107 and 108. The extension 107 is formed with a suitable opening to journal the one end of coupling bar 109 as shown, said coupling bar being held against forward longitudinal movement by a pin 110. The other end of the coupling bar 109 is formed with a circular head 111 having a central opening adapted for receiving the extension 108. The lower end of this opening is enlarged. A pin 112 extends through the lower end of the extension and has its ends disposed in the enlargement of the opening in the head 111. By this arrangement as is obvious the coupled tractors may have independent side swaying and rolling motion without affecting each other.

While I have shown and described the preferred form of my invention it is to be understood that I am aware of the fact that the construction, combination and arrangement of parts may be changed by those skilled in the art without departing from the spirit of my invention, as indicated by the appended claims.

I claim:

1. In combination, a pair of drive wheels, a stationary shaft mounted between said wheels, a pair of differential ring gears loosely mounted upon said shaft, a ring surrounding the ring gears and rotatably supporting a plurality of differential pinions disposed between the ring gears and adapted to constantly mesh therewith, power means for driving said ring gears in either direction, a clutch whereby each differential ring gear may be connected to its associated drive wheel, and means shiftable upon the shaft for locking the two ring gears together.

2. In combination, a pair of drive wheels, a stationary shaft mounted between said wheels, a pair of differential ring gears loosely mounted upon said shaft, a ring surrounding the ring gears and rotatably supporting a plurality of differential pinions disposed between the ring gears and adapted to constantly mesh therewith, power means for driving said ring in either direction, a clutch whereby each differential ring gear may be connected to its associated drive wheel, and means whereby the two differential ring gears may be locked together.

3. In combination, a pair of drive wheels, a stationary shaft mounted between said wheels, a pair of differential ring gears loosely mounted upon said shaft, a ring surrounding the ring gears and rotatably supporting a plurality of differential pinions disposed between the ring gears and adapted to constantly mesh therewith, power means for driving said ring in either direction, a clutch whereby each differential ring gear may be connected to its associated drive wheel, and a key adapted to be moved for rigidly locking the differential ring gears together.

4. In combination, a pair of drive wheels, a stationary shaft mounted between said wheels, a pair of differential ring gears loosely mounted upon said shaft, a ring surrounding the ring gears and rotatably supporting a plurality of differential pinions disposed between the ring gears and adapted to constantly mesh therewith, power means for driving said ring in either direction, a clutch whereby each differential ring gear may be connected to its associated drive wheel, and a ring slidable upon said shaft and having a finger or a key projecting therefrom adapted to enter alined recesses in the hub portion of said differential ring gears for locking said ring gears together.

5. In combination, a pair of drive wheels, a stationary shaft mounted between said wheels, a pair of differential ring gears loosely mounted upon said shaft, power means whereby said rings may be individually rotated, means whereby each differential ring gear may be connected to its associated drive wheel, and means whereby the differential ring gears may be locked together.

6. In combination, a pair of drive wheels, a stationary shaft mounted between said drive wheels, a cog wheel carried by each drive wheel, a pinion mounted on said shaft for each cog wheel and in constant mesh therewith, a pair of differential ring gears loosely mounted upon said shaft, means whereby said ring gears may be rotated individually or jointly, and a clutch member for each differential ring gear adapted to connect the same with the associated pinions.

LEONIDAS JAMES MITCHELL.